(12) United States Patent
Lötzsch et al.

(10) Patent No.: US 9,193,863 B2
(45) Date of Patent: Nov. 24, 2015

(54) THERMOCHROMIC MATERIAL, MOLDED ARTICLE COMPRISING SAID MATERIAL AND USE THEREOF

(71) Applicant: FRAUNHOFER-GESELLSCHAFT ZUR FÖRDERUNG DER ANGEWANDTEN FORSCHUNG E.V., München (DE)

(72) Inventors: Detlef Lötzsch, Berlin (DE); Ralf Ruhmann, Berlin (DE); Arno Seeboth, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/430,419

(22) PCT Filed: Aug. 8, 2013

(86) PCT No.: PCT/EP2013/066604
§ 371 (c)(1),
(2) Date: Mar. 23, 2015

(87) PCT Pub. No.: WO2014/044462
PCT Pub. Date: Mar. 27, 2014

(65) Prior Publication Data
US 2015/0247001 A1     Sep. 3, 2015

(30) Foreign Application Priority Data

Sep. 24, 2012  (DE) .......................... 10 2012 018 813

(51) Int. Cl.
| | | |
|---|---|---|
| C08L 67/04 | (2006.01) | |
| C08G 63/91 | (2006.01) | |
| C08L 1/12 | (2006.01) | |
| C08K 5/1545 | (2006.01) | |

(52) U.S. Cl.
CPC ............... *C08L 67/04* (2013.01); *C08G 63/912* (2013.01); *C08K 5/1545* (2013.01); *C08L 1/12* (2013.01); *C08L 2666/28* (2013.01); *C08L 2666/34* (2013.01)

(58) Field of Classification Search
CPC ....... C08L 1/12; C08L 67/04; C08L 2666/28; C08L 2666/34; C08K 5/1545
See application file for complete search history.

(56) References Cited

U.S. PATENT DOCUMENTS

| | | |
|---|---|---|
| 4,121,010 A | 10/1978 | Lasky et al. |
| 5,527,385 A | 6/1996 | Sumii et al. |
| 6,887,307 B1 | 5/2005 | Scott et al. |
| 7,267,718 B2 | 9/2007 | Scott et al. |
| 7,662,466 B2 | 2/2010 | Seeboth et al. |
| 2002/0037421 A1 | 3/2002 | Arnaud et al. |
| 2005/0031853 A1 | 2/2005 | Scott et al. |
| 2006/0166822 A1 | 7/2006 | Senga et al. |
| 2006/0246292 A1 | 11/2006 | Seeboth et al. |
| 2011/0206836 A1 | 8/2011 | Wen et al. |
| 2012/0201865 A1 | 8/2012 | Dorairaju et al. |

FOREIGN PATENT DOCUMENTS

| | | |
|---|---|---|
| DE | 103 39 442 A1 | 3/2005 |
| DE | 600 20 716 T2 | 12/2005 |
| DE | 103 39 442 B4 | 7/2006 |
| DE | 10 2007 017 791 A1 | 10/2008 |
| EP | 1 026 221 A2 | 8/2000 |
| EP | 1 084 860 A2 | 3/2001 |
| EP | 1 157 802 A2 | 11/2001 |
| EP | 1 323 540 A2 | 7/2003 |
| EP | 1 084 860 B1 | 11/2004 |
| WO | WO 2005/021627 A1 | 3/2005 |

OTHER PUBLICATIONS

U.S. Appl. No. 10/568,210, filed Aug. 23, 2004.
U.S. Appl. No. 12/596,072, filed Apr. 16, 2008.
U.S. Appl. No. 12/735,162, filed Apr. 13, 2011.
Bamfield, "Chromic Phenomena," The Royal Society of Chemistry, 33-41 (2001).
European Patent Office, International Search Report in International Application No. PCT/EP2013/066604 (Aug. 29, 2013).
German Patent and Trademark Office, Office Action in German Patent Application No. 10 2012 018 813.7 (May 7, 2013).
European Patent Office, International Preliminary Report on Patentability in International Application No. PCT/EP2013/066604 (Apr. 2, 2015).

*Primary Examiner* — Robert Jones, Jr.
(74) *Attorney, Agent, or Firm* — Leydig, Voit & Mayer, Ltd.

(57) ABSTRACT

The invention relates to a thermochromic material comprising at least one biopolymer, at least one natural dye and at least one reaction medium, selected from the group of fatty acids and derivatives thereof, gallic acid and derivatives thereof and mixtures thereof. The thermochromic material according to the invention is completely based on non-toxic, natural products. Processing into materials or molded articles can occur, according to the invention, by means of conventional extrusion technology in the form of flat film, blown film or sheets or multi-wall sheets. The thermochromic material can be used in particular in the food industry and medical technology.

14 Claims, 1 Drawing Sheet

THERMOCHROMIC MATERIAL, MOLDED ARTICLE COMPRISING SAID MATERIAL AND USE THEREOF

CROSS-REFERENCE TO RELATED APPLICATIONS

This patent application is the U.S. national phase of International Application No. PCT/EP2013/066604, filed on Aug. 8, 2013, which claims the benefit of German Patent Application No. 10 2012 018 813.7, filed Sep. 24, 2012, the disclosures of which are incorporated by reference in their entireties for all purposes.

The invention relates to a thermochromic material comprising at least one biopolymer, at least one natural dye and also at least one reaction medium, selected from the group of fatty acids and the derivatives thereof, gallic acid and the derivatives thereof and also mixtures hereof. The thermochromic material according to the invention is thereby based entirely on non-toxic natural products. Processing to form materials or moulded articles can be effected by means of conventional extrusion technology in the form of flat films, blown films or sheets or multiskin sheets. The thermochromic material is used in particular in the foodstuff industry and in medical technology.

Thermochromism comprises the property of changing the colour of a material, as a function of the temperature, reversibly or irreversibly. This can be effected both by changing the intensity and/or the wavelength maximum. Examples and theoretical backgrounds relating to the mechanism of the temperature-controlled colour are described representatively in Chromic Phenomena by P. Bamfield and M. I. Hutchings (The Royal Society of Chemistry, 2010) and in Thermochromic Phenomena in Polymers by A. Seeboth and D. Lotzsch (Smithers Rapra Technology, 2008).

Materials in the most varied of material forms, amongst those also polymer films with thermochromic properties, have been patented in the past in various ways. Irrespective of whether the thermochromic effect is of a reversible or irreversible nature, inorganic or organic dyes are used, the latter also in the form of composites with melting agents and/or developers, it is common to all systems that they always comprise toxic starting materials in some form. Standard in this respect is the use of bisphenol as developer almost in all existing organic thermochromic composites. As dyes, basic structures of triphenylmethane dyes, pyridinium phenol betaines, sulphophthalein structures, thyranines, azo dyes or fluoran dyes are used.

Inorganic thermochromic pigments, the colour change of which is based on a temperature-controlled change of modification, are based in general on salts of heavy metals. A known example is the use of thermochromic inorganic pigments as hot spot warning for pans or as screen printing for bar codes. Encapsulation of heavy metal salts or organic thermochromic composites likewise does not offer an alternative here; migration effects cannot be stopped permanently. The generally used melamine resins as case for thermochromic capsules are definitively unsuitable as protective layer and in addition are not suitable for extrusion technology.

Thus, the change of a colour effect, based on a donor-acceptor system, is described in EP 1 084 860, which system can be present also in the form of microcapsules with a diameter of approx. 50 μm. In EP 1 323 540 A2, a thermochromic material consisting of three components which is likewise microencapsulated is described. Lack of light stability of the thermochromic complexes is intended to be counteracted, corresponding to U.S. Pat. No. 5,527,385, by additives such as hydrazide-, sulphur- or phosphorus compounds. This implies the addition of further toxic compounds.

The production of polymeric thermochromic materials with the help of imprinting (laminating) of a thermochromic paint is a practical solution for some requirements and wishes of the packaging industry, where toxicity plays a subordinate role. Thus according to US 2002037421, glasses are imprinted with a paint for use in sun protection or, corresponding to U.S. Pat. No. 4,121,010, polymers are coated with a thermochromic paint, consisting of sulphates, sulphides, arsenic, bismuth, zinc and other materials, and the oxides thereof. As a result, both the field of use is greatly restricted and, as a result of the required additional coating (printing technique), a cost-reducing continuous technology is prevented.

In DE 103 39 442 B4 and U.S. Pat. No. 7,662,466 B2, thermochromic flat films which are likewise based on the use of the above-mentioned organic dyes are described.

This also applies to the invention described in EP 1 157 802. Here, in extrusion-blow moulding, thermochromic pigments are added only in partial regions of the wall thickness of a plastic material container. This takes place by the addition of a reversible thermochromic pigment in the form of strip-shaped inlays. The thermochromic pigments require in addition additional thermostable pigments and are added or fed to the extrudate before discharge from the extrusion head.

To date, thermochromic inks, screen printing inks, coatings or films have not been used in sensitive areas, such as the foodstuff sector or medical technology. An essential reason is, categorically, the use of toxic compounds. Also the most recent thermochromic dyes with a diazapentalene structure (G. Qian and Z. Y. Wang, Adv. Mater. 24, 2012, page 1582) do not offer an approach to the solution.

Starting herefrom, it was the object of the present invention to provide a thermochromic material which can be used in many fields of daily life, e.g. in the foodstuff sphere. Likewise, the thermochromic material should be produced such that further processing by means of extrusion technology is possible.

This object is achieved by the features of the thermochromic material described herein, the extruded moulded articles made therefrom, and the advantageous developments thereof. Uses according to the invention are also described.

According to the invention, a thermochromic material is provided, which material comprises at least one biopolymer, at least one natural dye and also at least one reaction medium selected from the group of fatty acids and the derivatives thereof, gallic acid and the derivatives thereof and also mixtures hereof. All the components contained in the thermochromic material thereby concern components or additives which are permitted for foodstuff, i.e. all the components in the dosages used are not toxic.

Preferably, all the components of the thermochromic material are permitted according to the EU regulation No. 1333/2008 and corresponding current appendices for foodstuff and have an E-number.

It is preferred that, as natural dyes, those with an anthocyanidin structure are used. These are subdivided into sugar-free aglycones and glycosides, both sub-structures being able to be used. As foodstuff additives, anthocyanidins with the E-number 163 are permitted. The colour of anthocyanidins which is dependent upon the pH value in aqueous solution is thereby known, whilst the thermochromic properties of anthocyanidins have to date not been known.

Preferred anthocyanidins are cyanidin, delphinidin, aurantinidin, petunidin, peonidin, malvidin, pelargondin, rosinidin, europinidin and luteolinidin. The basic structure is illustrated in FIG. 1. By varying the radicals $R^3$ to $R^7$ (R with —H, —OH, —OCH$_3$), the properties can be widely varied. The formation of dimers, aggregates/chelates, both amongst each other and with the biopolymer or the reaction medium, is made possible. If a sugar radical is introduced in positon $R^3$, glycoside structures are attained (FIG. 2).

As reaction medium, gallic acid and the derivatives thereof, in particular gallates, saturated, once unsaturated or multiply unsaturated fatty acids and the derivatives thereof, in particular esters, and also branched carboxylic acids are preferred. An essential property feature of carboxylic acids is their self-organisation to form dimers.

A large number of fatty acids can be used to form the thermochromism. Advantageously, thermochromic properties can be produced within a wide operational field; this is associated inter alia with the melting point of the fatty acids and can be controlled between −55° and +81° C. by the specific fatty acids. If required, the operating range can be widened even further.

As fatty acids, both unsaturated and saturated fatty acids and also mixtures hereof can be used.

The unsaturated fatty acids are preferably selected from the group consisting of petroselinic acid, palmitoleic acid, myristoleic acid, oleic acid, elaidic acid, gadoleic acid, undecylenic acid, icosenic acid, vaccenic acid, cetoleic acid, erucic acid, nervonic acid, cervonic acid, clupanodonic acid, timnodonic acid, linoleic acid, calendic acid, punicic acid, eleostearic acid, arachidonic acid and mixtures hereof.

The saturated fatty acids are preferably selected from the group consisting of formic acid, acetic acid, caprylic acid, pelargonic acid, caproic acid, laroic acid, myristic acid, palmitic acid, margaric acid, stearic acid, arachic acid, propionic acid, butyric acid, valeric acid, caproic acid, onanthic acid, behenic acid, lignoceric acid, cerotic acid, montanic acid, melissic acid and mixtures hereof.

It is easily recognisable for the person skilled in the art that also a large number of structural derivatives, such as alpha-, gamma- or beta structures, can be used here or also ester-, amine- or amide structures. It is obvious that the fatty acids or the derivatives thereof can be used also in the form of mixtures. Thus esters of stearic acid, palmitic acid, linoleic acid, erucic acid have proved, inter alia, to be particularly complex-stabilising. Fatty acids and fatty acid esters are marketed in the foodstuff sector under the numbers E570 or E304.

In addition to fatty acids, gallic acids and the derivatives thereof, in particular ester compounds (gallates), are preferred for use as reaction medium. Mixtures of fatty acids and gallates are likewise usable. Gallates and also fatty acids are permitted for foodstuff. For example, E312—dodecylgallate, E311—octylgallate and E310—propylgallate should be mentioned.

As branched carboxylic acids, phytanic acid, isovaleric acid or etheric oils are preferred.

According to the invention, the non-toxic thermochromic material is made possible by physicochemical interaction between anthocyanidin, biopolymer and fatty acid. A temperature-controlled proton transfer in the anthocyanidin structure triggers the change in colour. Both the intensity and the wavelength maximum can hereby be switched. Thus, a thermochromic switching effect can be produced via i) the formation or dissolution of hydrogen bridges in the system, ii) the formation of domains/aggregates/chelates, preferably controlled by the interaction of the fatty acid or gallates with the polar polymer chain, e.g. with CA/CTA, PHB or PLA, iii) the formation of ordered structures between biopolymer— natural dye—fatty acid and/or gallate, as are well known in biomaterials as self-orientating systems (see H. Ringsdorf, Applied Chem. 104, 1990, 1310) or also iv) by cooperation of the above-mentioned three effects i, ii, and iii. The process can be designed reversibly or irreversibly. As a function of the temperature, reorientations on a molecular plane are effected, bonds are reinforced or loosened and a concentration gradient of the natural dye or of the fatty acid and/or gallate in the polymer volume are enabled reversibly or irreversibly. Thus, the interaction between the fatty acid and the anthocyanidin is changed as a function of the temperature whilst, at the same time, both compounds change their interaction either respectively individually or as acting complex with the polymer chain. In the individual case, all the compounds are integrated in the polymer structure via physicochemical interactions, this thereby changing naturally. In this case, a new superordinate polymer structure is formed, which cannot be broken down further. The interactions between the different molecules can be triggered both via the polar and dispersive structural units. The system consequently attains exceptional thermodynamic stability. As a result, the optical macroscopic properties are changed. During differential scanning calorimetry (DSC), only one peak is visible in this case which differs from the peak of the pure polymer. Glycosides are suitable in particular for the formation of superordinate structures. By means of the sugar unit in $R^3$ position (cyanidin-3-glucoside), an aggregate structure (chelate complex) can be achieved. This mechanism is used in nature to increase for example also the light stability of natural dyes. The sugar radicals are disposed in layers which are stabilised in addition by the chair form. It is obvious that the sugar structure is capable of further interaction with fatty acids and/or gallates.

The molar ratio between the starting compounds anthocyanidin and fatty acid and/or gallate, including the derivatives and mixtures thereof, crucially controls the proton transfer in the natural dye and hence the thermochromic behaviour. Subsequently, mass ratios are indicated with respect to the processing. When using mixtures of fatty acids and gallates, ratios of 1:99 or 99:1 can be used. Fatty acid or gallate or the mixture thereof are used with 10- to 50-times excess, with respect to the anthocyanidin dye, preferably with 15- to 35-times excess. The anthocyanidin acid (and/or gallate) complex is found with 2-38% in the biopolymer, preferably with 7-15%.

Further variables with an influence on the macroscopic optical behaviour are the molar mass, the MFR value and the crystalline/amorphous structure of the biopolymers which are used.

It is clear for the person skilled in the art in extrusion technology that the technological parameters used, such as the temperatures of the respective heating zones, of the slot die or chill roll, the discharge speed, the screw geometry, speed of rotation and compound pressure or dwell time have an additional influence on the resulting thermochromic behaviour of the non-toxic polymer materials.

Essential components of the invention are correspondingly the production of thermochromism by interaction of the used components, including their long-term stability, on the one hand, and, on the other hand, the development of a technology for producing thermochromic compounds or batches/master batches. The compound or batch/master batch can be further processed in the extrusion process to form films, sheets, multiskin sheets. The layer thickness of the films is between 50 and 300 µm. Sheets can be up to 5 mm thick. The thermochromic films and sheets can be coextruded with further layers. These additional layers can produce further functions in the material or the component, such as light stability, permanent colours and hence introduce a resulting subtractive colour system or increased mechanical stability in the material.

The subject according to the invention is intended to be explained in more detail with reference to the subsequent Figures and the example, without wishing to restrict said subject to the specific embodiment shown here.

EXAMPLE

Figure 1:
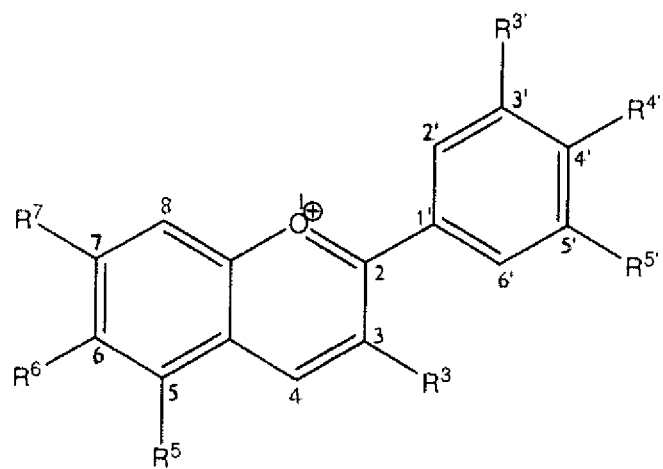
FIG. 1 shows the basic structure of anthocyanidins with reference to a chemical formula.
Figure 2:
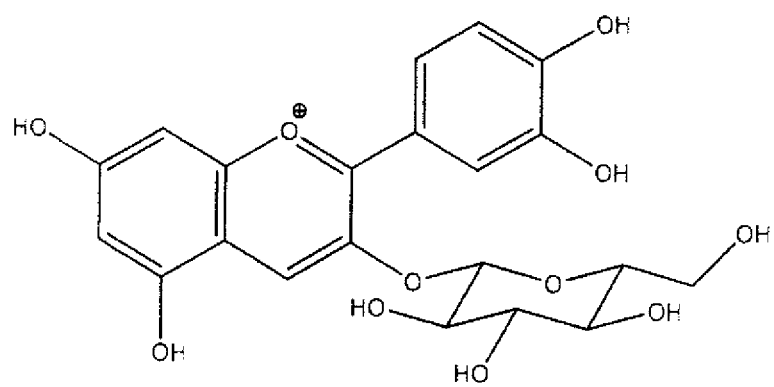
FIG. 2 shows the chemical formula of the basic structure of a glycosine.

According to the invention a non-toxic thermochromic biopolymer film can be produced as follows. In a first step, a complex consisting of palmitic acid, laurylgallate and cyanidin chloride in the ratio 1:1.5:0.02 is prepared at a temperature above 115° C. and a reaction duration of 15 min. In a twin-screw compounder, 8.5% by weight of the complex is processed with 91.5% by weight of PLA 4060 to form a compound at a screw speed of rotation of 20 rpm. The temperatures of the heating zones 1 to 5 are 175° C./185° C./185° C./180° C./160° C. As a result, a colourless compound is obtained at room temperature, which compound changes into the blue state when heated to approx. 65° C. The effect is reversible. In a single-screw extruder, the compound is processed into a thermochromic mono-PLA-biopolymer film, according to the known method, the temperature of the chill roll being 45° C. The reversible colour change of the film is as for the compound at approx. 65° C.

The invention claimed is:

1. A thermochromic material comprising at least one biopolymer, at least one natural dye and at least one reaction medium selected from the group of fatty acids and derivatives thereof, gallic acid and derivatives thereof and mixtures thereof,
   wherein all the components of the thermochromic material optionally contain components or additives which are permitted for foodstuff.

2. The thermochromic material according to claim 1, wherein the at least one natural dye has an anthocyanidin structure.

3. The thermochromic material according to claim 1, wherein the at least one reaction medium is selected from the group consisting of petroselinic acid, palmitoleic acid, myristoleic acid, oleic acid, elaidic acid, gadoleic acid, undecylenic acid, icosenic acid, vaccenic acid, cetoleic acid, erucic acid, nervonic acid, cervonic acid, clupanodonic acid, timnodonic acid, linoleic acid, calendic acid, punicic acid, eleostearic acid, arachidonic acid, formic acid, acetic acid, caprylic acid, pelargonic acid, caproic acid, laroic acid, myristic acid, palmitic acid, margaric acid, stearic acid, arachic acid, propionic acid, butyric acid, valeric acid, onanthic acid, behenic acid, lignoceric acid, cerotic acid, montanic acid, melissic acid, dodecylgallate, octylgallate, propylgallate, phytanic acid, isovaleric acid or etheric oils or mixtures thereof.

4. The thermochromic material according to claim 1, wherein the at least one biopolymer is suitable for flat film- or blown film extrusion or for manufacture of sheets.

5. The thermochromic material according to claim 1, wherein the at least one biopolymer is selected from the group consisting of polyhydroxybutanoic acid, cellulose acetate, polylactic acid and copolymers and polymer blends thereof.

6. The thermochromic material according to claim 1, wherein all the components of the thermochromic material are permitted for foodstuff according to the EU regulation No. 1333/2008 and corresponding current appendices for foodstuff and have an E-number.

7. The thermochromic material according to claim 1, wherein the thermochromic effect of the material is reversible or irreversible.

8. The thermochromic material according to claim 1, wherein thermochromic effect is produced by physico-chemical interactions of the components.

9. The thermochromic material according to claim 1, wherein the thermochromic material is extrudable.

10. An extruded moulded article comprising a thermochromic material according to claim 1.

11. The moulded article according to claim 10, wherein the moulded article is a flat film or a blown film.

12. The moulded article according to claim 10, wherein the moulded article is a sheet or a multiskin sheet.

13. A method comprising utilizing the thermochromic material and molded articles made therefrom in the foodstuff industry and medical technology according to claim 1.

14. The thermochromic material according to claim 2, wherein the at least one natural dye is selected from the group consisting of cyanidin, delphinidin, aurantinidin, petunidin, peonidin, malvidin, pelargondin, rosinidin, europinidin, luteolinidin and mixtures thereof.

* * * * *